United States Patent [19]

Aruga et al.

[11] Patent Number: 5,041,935
[45] Date of Patent: Aug. 20, 1991

[54] ROTARY ACTUATOR FOR POSITIONING MAGNETIC HEADS IN A DISK DRIVE

[75] Inventors: Keiji Aruga, Hiratsuka; Norihiko Suzuki, Sagae; Tomoyoshi Yamada, Yokohama; Hiroshi Maeda, Isehara; Takahiro Imamura, Fujisawa, all of Japan

[73] Assignee: Fujitsu Limited, Kawasaki, Japan

[21] Appl. No.: 392,499

[22] Filed: Aug. 11, 1989

[30] Foreign Application Priority Data

Aug. 17, 1988 [JP] Japan .................................. 63-203090
Sep. 9, 1988 [JP] Japan .................................. 63-224705
Nov. 26, 1988 [JP] Japan .................................. 63-297209

[51] Int. Cl.$^5$ ............................................. G11B 5/55
[52] U.S. Cl. .................................. 360/106; 360/97.02
[58] Field of Search ........................................ 360/106

[56] References Cited

U.S. PATENT DOCUMENTS 4,346,416 8/1982 Riggle .................................. 360/106
4,933,792 6/1990 Sleger .................................. 360/106

FOREIGN PATENT DOCUMENTS 0127058 5/1984 European Pat. Off. ............ 360/106

Primary Examiner—A. J. Heinz
Attorney, Agent, or Firm—Armstrong, Nikaido, Marmelstein, Kubovcik & Murray

[57] ABSTRACT

A rotary actuator for positioning magnetic heads in a disk drive, comprising a stator assembly and a rotor assembly. An arm assembly having magnetic heads are fixed to the rotor assembly, which rotates back and forth within a limited angle range around a fixed axis of the rotary actuator due to the forces between plural magnets and driving current which flows though flat coils. Two flat coils are aranged on an arcuate inner surface of the stator such that two adjacent vertical parallel portions thereof closely contact with each other. Two flat coils have an electrical connection with a driving source that the currents through the two adjacently parallel portions flow in the same direction. Three permanent magnets are disposed on the rotor surface, the central magnet having a greater lateral width than that of other two side magnets, and a polarity of the central magnet is opposite to that of other magnets. In another embodiment, each of flat coils comprises an inner coil and an outer coil resulting in enhancing the torque of the rotary actuator. Several modifications of coil and permanent magnet arrangement, and other related improvements in the structure thereof are also disclosed.

19 Claims, 16 Drawing Sheets

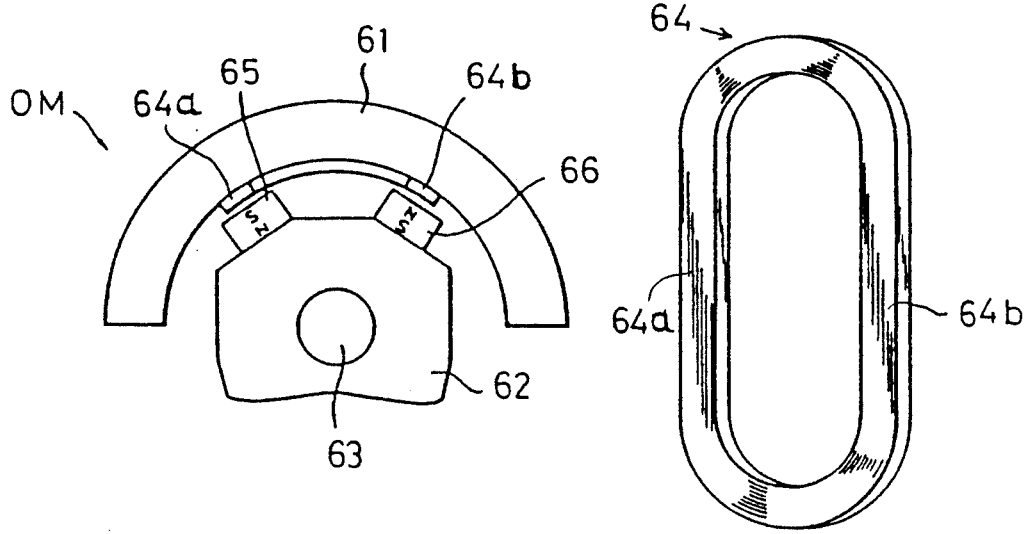
FIG. 3 PRIOR ART
FIG. 4
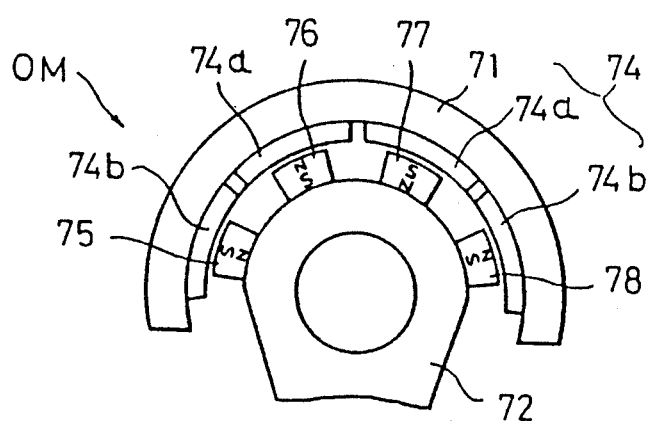
FIG. 5  PRIOR ART

MAGNETIC FLUX DENSITY

ROTARY ACTUATOR FOR POSITIONING MAGNETIC HEADS IN A DISK DRIVE

BACKGROUND OF THE INVENTION

1. Field of the Invention

This invention relates to a rotary actuator for a disk drive used as external storage in a computer system. More particularly, this invention relates to a rotary actuator for positioning a read/write head onto the target track in a disk drive. This invention is intended to provide a rotary actuator having an increased access speed and high reliability.

2. Description of the Related Art

A magnetic disk drive or an optical disk drive has made a remarkable progress in storage capacity in recent years. For example, a storage capacity of 1 gigabytes per spindle can be obtained in a hard magnetic disk drive.

There are two types in positioning the magnetic heads: (1) linear actuator type and (2) rotary actuator type. This invention relates to the latter type and an example of the prior art technology is disclosed in Japanese Unexamined Patent Publication SHO-56-88663 by I. Kitamura et al. dated on July 18, 1981.

FIGS. 1 and 2 show schematically a fundamental structure of the rotary actuator and a disk assembly DA, and a disk drive respectively. FIG. 1 shows a perspective view, in which the stacked magnetic disk assembly DA and the rotary actuator assembly OM with magnetic heads are separated. FIG. 2 shows a plan view of the disk drive, in which these component units are assembled.

A spindle 36 having a plurality of disks 37 at equal intervals (in FIG. 1 10 disks are shown) rotates at a speed of 3600 rpm. The data are recorded on both surfaces of the disk 37, and a magnetic head 31, two magnetic heads being arranged on each arm 32, is positioned on a specified track on the disk surface by an actuator movement and perform a read/write operation.

In the rotary actuator type, the arm 32 of the actuator assembly can move or rotate within a specified angle $\theta$ as shown in FIG. 2, and the movement thereof is precisely controlled by a rotary actuator OM. The rotary actuator OM can not rotate continuously but rotate within a limited angle range, therefore, the motor OM is hereinafter called a rotary actuator in the present invention.

The rotary actuator OM includes a stator assembly 34 and a rotor assembly 33. The stator assembly 34 comprises a stator housing 39 and a yoke and coils (these are not shown). The rotor assembly 33 comprises a plurality of arms 32 fixed to a rotor yoke (not shown) in a projecting way. A number of arms is equal to that of disks or in a range between number of disks plus one and minus one (9 arms are shown in FIG. 1). At each far end of arms 32, a head assembly 30 is disposed having two magnetic heads 31.

As shown in FIG. 2, the rotary actuator OM is arranged at a corner of a disk enclosure 38, and the stator housing 39 forms a part of a completed disk enclosure. The rotary actuator OM is positioned in such a way that, when the rotor 33 rotates within the angle $\theta$, the magnetic head 31 located at far end of the combination of arm 32 and head assembly 30, can sweep the entire recording region on the disk surface.

In order to reduce an access time in the disk drive, it is desirable that the rotary actuator OM has a high torque performance.

As a structure of the rotary actuator, two types have been known and utilized; (1) moving coil type and (2) moving magnet type. The moving coil type comprises a stator with permanent magnets and a rotor with coils, and the moving magnet type comprises a stator with coils and a rotor with permanent magnets. An example of the latter type is disclosed in U.S. Pat. No. 4,346,416, issued on Aug. 24, 1982 to C. M. Riggle etal., and the same is also disclosed in Japanese Patent Publication SHO-62-35181 dated on July 31, 1987.

FIG. 3 shows a schematic cross section of the rotary actuator OM of the prior art, the cross section being vertical to the longitudinal axis thereof. A stator includes a yoke 61 and a flat coil 64 arranged on an inside surface of the yoke 61 and further includes an axis 63 fixed to the stator. The coil 64 has a shape as shown in FIG. 4. A rotor 62 can move around the axis 63 and holds two permanent magnets 65 and 66, which are elongated in a direction vertical to the sheet and facing parallel windings 64a and 64b in a longitudinal direction. The polarity arrangements of two permanent magnets 65 and 66 are reversed. The permanent magnet 65 has an S pole facing the coil winding 64a and the permanent magnet 66 has an N pole facing the other coil winding 64b.

When the rotary actuator OM is actuated, an electrical current flows along the coil winding. The directions of the current flow along the coil windings 64a and 64b are opposite and further the directions of magnetic flux in the gap regions are also opposite, therefore, the rotor is subjected to two torques working additively. The movement of the rotor 62 can be precisely controlled by the direction and the magnitude of the electrical current.

The structure of the rotary actuator OM shown in FIG. 3 develops a comparatively small torque because it has only one pair of poles (two pole type). In order to obtain a larger torque, a structure having two pair of poles (four pole type) and two coils, is disclosed in Japanese Unexamined Patent Publication SHO-60-5480 dated on Jan. 12, 1985.

The four pole type of a rotary actuator OM is schematically shown in FIG. 5. Two flat coils 74 are arranged on an inside surface of a yoke 71, and four permanent magnets 75 to 78 are fixed on a rotor 72. This type of the rotary actuator OM has a capacity to develop a larger torque and an effect to reduce the magnitude of the magnetic flux compared with the two pole type, resulting in making a thickness of the coil thin.

In designing a rotary actuator having a rotor with four magnetic poles, it becomes a problem to arrange plural permanent magnets in a limited area of the rotor surface. In FIG. 5, the details of a mechanical structure for supporting a plurality of arms are not shown for simplicity, each arm having a head assembly. The arm assembly restricts utilization of the entire surface of the rotor, and further, the radius of the rotor is smaller than that of the yoke. Therefore, a circumferential width of each permanent magnet is inevitably reduced. This fact reduces the intensity of the magnetic flux in the gap between the permanent magnet and the coil, resulting in reducing the torque of the rotary actuator.

SUMMARY OF THE INVENTION

It is a general object of the invention, therefore to provide a rotary actuator having a larger motor torque within a limited space of a specified outline.

It is a more specific object of the invention to provide a rotary actuator of a multipole type having a larger motor torque.

It is another object of the invention to provide a rotary actuator having a uniform motor torque over a whole range of rotation thereof.

It is still another object of the invention to provide a rotor and arm assembly comprised in a rotary actuator, a natural vibration frequency thereof being as high as possible.

It is further object of the invention to provide a rotor and arm assembly comprised in a rotary actuator which has a characteristic of absorbing a natural vibration energy generated in the rotor and arm assembly.

It is still further object of the invention to provide a structure for fixing a rotary actuator in a disk drive in order to maintain a precise parallel alignment of the center axis thereof with the spindle of the disk assembly.

It is still further object of the invention to provide an improved structure for fixing a head assembly to the arm and a stator structure for improving the cooling thereof.

Foregoing and related objects for obtaining a rotary actuator with a larger motor torque are accomplished by the rotary actuator of the present invention which comprises a stator having a yoke, an inside surface thereof being substantially of an arcuate shape in a longitudinal direction, a rotor arranged in a region defined by the arcuate shape of the yoke and supported rotatably around a fixed axis to the stator, an arm assembly fixed to the rotor projecting therefrom in an opposite direction toward the yoke, three permanent magnets disposed on an outer surface of the rotor, a width of the central magnet being larger than those of other two magnets, and two flat coils, each coil being arranged on an inside surface of the yoke and having two parallel portions and two turning portions, adjacent parallel portions of the two flat coils closely contacting with each other, and the two flat coils having connection to a power source that electric currents along the above two adjacent vertical parallel portions are in the same direction.

The motor torque and a uniformity thereof in the whole rotation range can be further improved by a rotary actuator in which the following features are added to the above structure. Each of two flat coils has an outer coil and an inner coil, the inner coil being arranged inside the outer coil, the turning portions of the inner coil being bent outwardly and overlapped over the turning portion of the outer coil and fitted in a recess or groove formed into the inside surface of the yoke. Both two flat coils have connection with a power source that current flowing through the centrally located parallel portions of a pair of the outer and inner coils are all in the same direction.

Further objects of attaining a rotary actuator having a characteristic of a suppressed vibration amplitude at resonant frequency are accomplished by introducing a dynamic absorber in a rotor and arm assembly, in which an elastic adhesive layer is provided between the arm assembly and the rotor assembly. When the arm assembly with a magnetic head located at the far end thereof, is driven by the rotor assembly, an accompanying natural oscillation thereof is suppressed by the dynamic damper formed of the elastic adhesive layer and the rotor assembly.

The fixing structure of a rotary actuator is accomplished by a structure in which the axis of a rotary actuator is firmly fixed to a main disk enclosure to which the disk assembly is also fixed.

Details of these modifications will become clear from a reading of the detailed description of the invention with reference to the drawings.

BRIEF DESCRIPTION OF THE DRAWINGS

FIG. 3 is a schematic cross section of a rotary actuator having two poles of the prior art, FIG. 4 shows a flat coil used in FIG. 3, FIG. 5 is a schematic cross section of a rotary actuator having four poles of the prior arts.

DETAILED DESCRIPTION OF THE PREFERRED EMBODIMENTS

Figure 1:
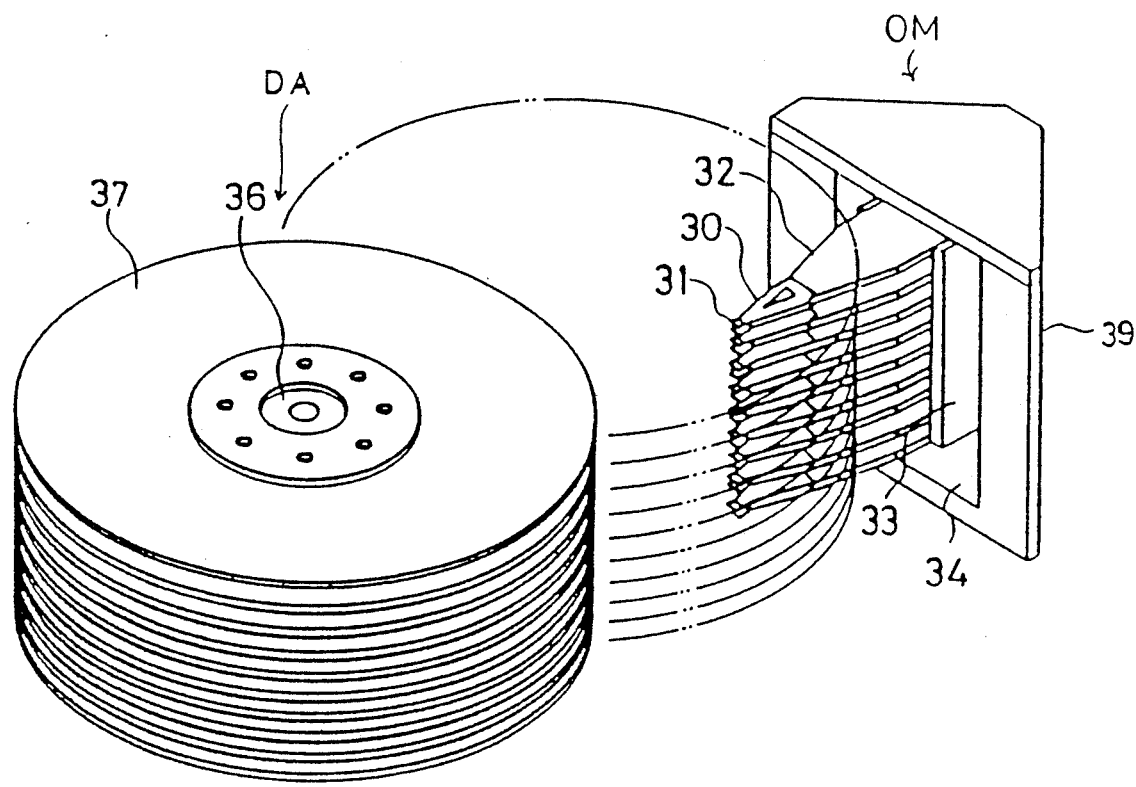
FIG. 1 is a perspective view of a stacked magnetic disk assembly and a rotary actuator assembly with magnetic heads.
Figure 2:
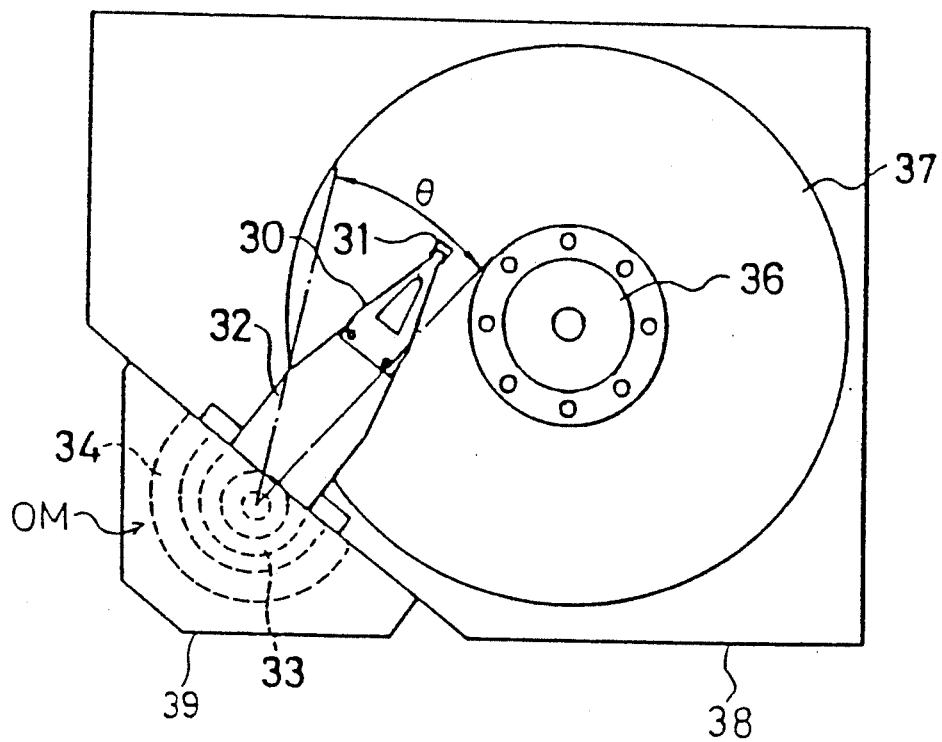
FIG. 2 shows a schematic plan view a disk drive in which the disk assembly and the rotary actuator assembly are combined forming a disk drive.
Figure 6:
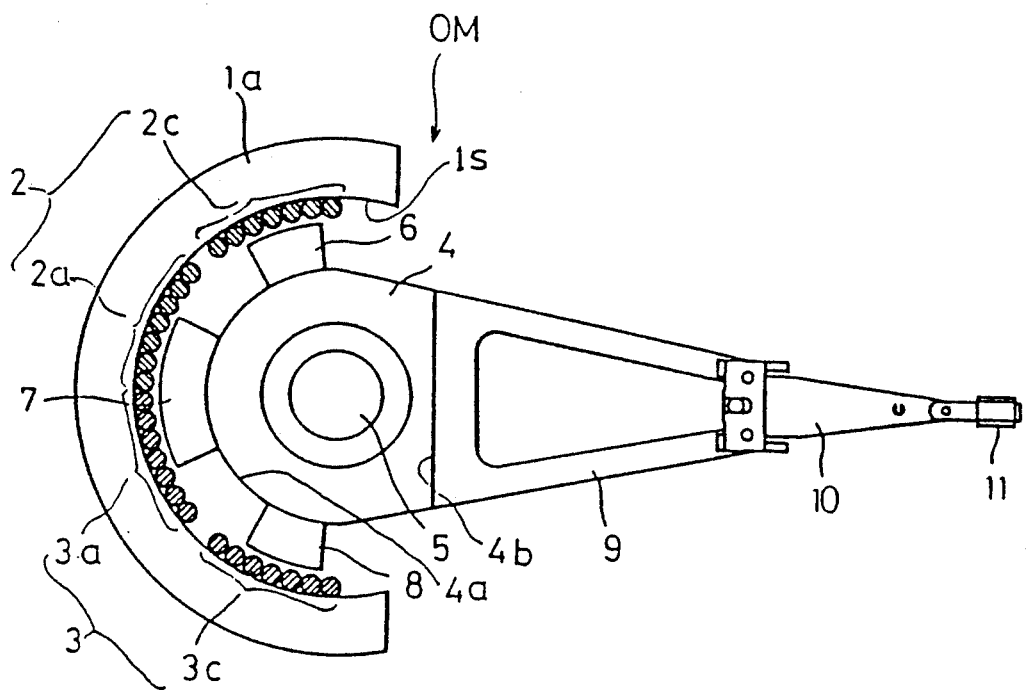
FIG. 6 is a schematic cross section of a first embodiment of a rotary actuator of the present invention using two flat coils and three permanent magnets.
Figure 8:
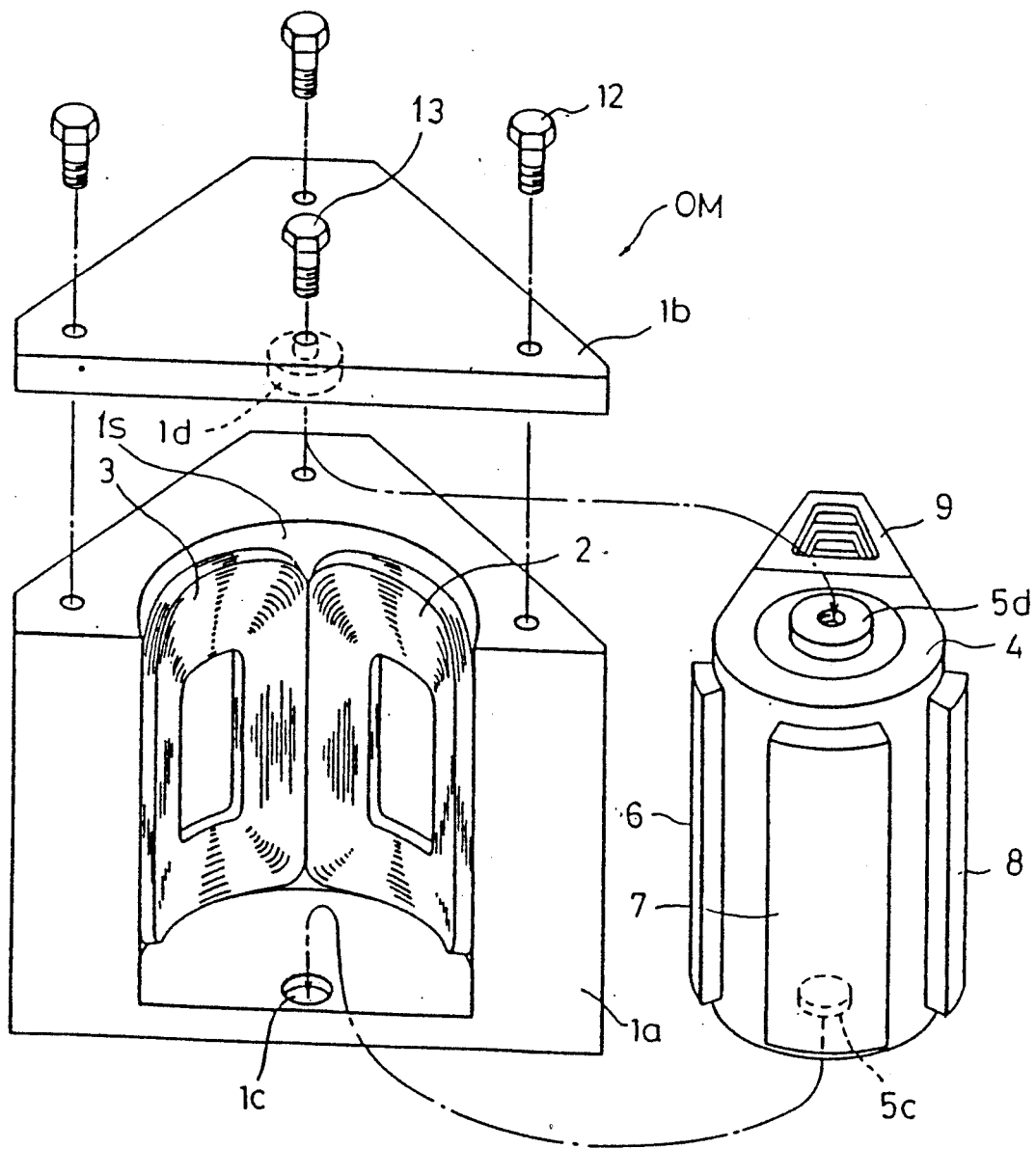
FIG. 8 shows a perspective view of the rotary actuator of the first embodiment, in which a yoke cover and a rotor and arm assembly are removed and separately shown.

FIGS. 6 and 8 show a schematic cross section and a perspective view of a rotary actuator OM of a first embodiment respectively, in which arrangements of permanent magnets and coils of the present invention are clearly shown. Other parts such as arms 9 and head assemblies 10 are illustrated in a simplified form.

Two flat coils 2 and 3 are fixed to an inside surface of a yoke core 1a, and these components are forming a main portion of a stator. As shown in FIG. 8, the stator comprises the yoke core 1a and a yoke cover 1b, however the yoke core 1a may be a combination of an outer member of aluminum alloy and an inner member of soft iron to reduce the weight thereof. The yoke core 1a has an arcuate inner surface 1s extending in a longitudinal direction, or the yoke core may be substantially a part of a semicylinder. A central axis 5 of a rotor 4 is fixed to the stator. In FIG. 8, both ends 5c and 5d of the axis 5 are shown. The rotor 4 can rotate back and forth around the axis 5. Three permanent magnets 6, 7, and 8 are fixed on one side 4a of a cylindrical surface of the rotor 4, facing the coils 2 and 3 on the yoke core 1a. The rotor 4 and permanent magnets 6 to 8 form a rotor assembly. A plurality of arms 9 are fixed to the rotor 4 projecting from an opposite side 4b of the rotor surface. A magnetic head assembly 10 with two magnetic heads 11 is attached on a far end of the arm 9.

In the embodiment, the core 1a constitutes a part of the disk enclosure of a disk drive, which makes it easy to cool the flat coils 2 and 3. The yoke core 1a is made of soft iron such as low carbon steel. Two flat coils 2 and 3 have substantially the same shape as shown in a plan view of FIG. 7. Substantial vertical parallel portions 2a, 2c, 3a and 3c of flat coils 2 and 3 are effective work zones for driving the rotor assembly, and horizontal portions 2b, 2d, 3b and 3d are turning portions of coil windings and do not contribute to drive the rotor assembly. Two flat coils 2 and 3 are arranged closely contacting with each other, and fixed on the arcuate inner surface of the yoke core 1a in a manner that a coil back surface closely contacts to the curved arcuate surface of the yoke core. Two adjacent vertical parallel portions 2a and 3a contact tightly with each other and face the central permanent magnet 7. Other vertical parallel portions 2c and 3c are positioned facing magnets 6 and 8 respectively.

Two pairs of terminals of the flat coils are connected to a power source which is driven by a servo system such that, when the coils are excited, electric currents flowing through two adjacent parallel portions 2a and 3a are in the same direction.

Three permanent magnets 6, 7, and 8 are made of samarium cobalt (SmCo), preferably, neodymium iron boron (NdFeB) which is an alloy magnet with rare earth metal, and these magnets are attached on a semi-cylindrical surface 4a of the rotor 4. Polarities of the permanent magnets 6, 7, and 8 are selected such that two side magnets 6 and 8 have the same polarity and the center magnet 7 has a reversed polarity. The rotor 4 is rotatable around the axis 5 via bearings (not shown).

A longitudinal length of three magnets is substantially the same as or not greater than that of the effective parallel portions of the flat coils. In the first embodiment, a lateral width of the center magnet 7 is about twice that of the other two side magnets 6 and 8. Each lateral width of the side magnets 6 and 8 is less than that of parallel portions 2c and 3c, and also a lateral width of the center magnet 7 is less than that of a combination of adjacent parallel portions 2a and 3a.

On the opposite surface 4b of the rotor 4, a plurality of arms 9, e.g., nine arms when ten disks are used, are fixed, maintaining an equal distance between adjacent two arms and projecting in an opposite direction toward the yoke core 1a. At a far end of each arm 9, a head assembly 10 is fixed with two magnetic heads 11. When the arms are actuated, a magnetic head 11 can be positioned on a target track on either a bottom or upper surface of of one of adjacent disks. When the rotary actuator OM is excited, in other words, the servo current flows through the flat coils 2 and 3, then permanent magnets 6, 7, and 8 are subjected to circumferential forces in the same direction, resulting in rotating the rotor 4 around the axis 5 with the arms 9 and positioning the magnetic head 11.

In the first embodiment, the flat coils 2 and 3 are disposed closely contacting with each other. Because there is no gap between two flat coils, a circumferential width of two parallel portions 2a and 3a can be increased. And further, because the directions of electric current in both parallel portions 2a and 3a are the same, the single integrated center permanent magnet 7 can be utilized. This is a strong advantage over the prior art in which four magnets are needed shown in FIG. 5.

In FIG. 6, flat coils 2 and 3 are shown schematically of a single layer winding, however, in an actual application, a multi-layer coil is utilized. The second, third and so forth layers of the coil winding are laminated on the first layer in the order.

In FIG. 8, the yoke cover 1b and the rotor 4 with permanent magnets 6 to 8 and arms 9 are dismantled and illustrated separately. The yoke cover 1b is fastened to the yoke core 1a by three bolts 12, and end portions 5c and 5d of the axis 5 (not shown) are inserted in holes 1c and 1d and fixed by bolts 13. The fixing method of the axis 5 shown in the FIG. 8 is conventional for simplicity, other method thereof of the present invention is disclosed later. FIG. 8 mainly aims to show clearly the actual arrangements of the flat coils 2 and 3 and the permanent magnets 6 to 8.

Figure 9:
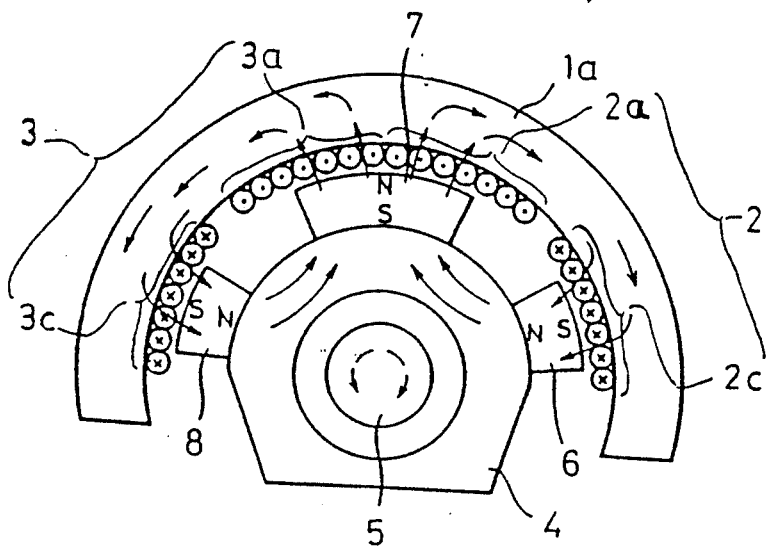
FIG. 9 is a cross section of the rotary actuator of the first embodiment for explaining the principle of the invention, in which directions of magnetic flux are illustrated.

FIG. 9 is a schematic cross section for explaining the principle of the first embodiment. The main differences from FIGS. 3 and 5 are that: (1) three permanent magnets are used contrary to two magnets of FIG. 3 and four magnets of FIG. 5; (2) the center magnet 7 of the embodiment has a wider width than those used in FIGS. 3 and 5; (3) the current directions of two adjacent parallel portions 2a and 3a of coil windings of the embodiment are the same, however, the current directions of two adjacent coil windings of FIG. 5 are opposite; and (4) there is no gap between two coils in the embodiment.

The magnetic flux penetrating through yoke 1a, the gap, permanent magnets 6 to 8 and the rotor 4 are shown by the arrows in FIG. 9.

The combination of two parallel portions 2a and 3a and the single center permanent magnet 7 may be regarded as forming a single pole in a multipole motor, therefore, the rotary actuator of the first embodiment may be called a three-pole motor, contrary to the two pole motor of FIG. 3 and the four-pole motor of FIG. 5 in the prior art.

When an electric current i flows through the coil windings, the total torque T is generated, which is given by the following equation.

$$T = B L i r,$$

where B is a magnetic flux density at the coil winding; L is an effective total length of the coil winding; and r is a distance from the pivotal center of the rotor to a surface of the permanent magnet.

When the structure of FIG. 9 is compared with that of FIG. 3 of the prior art, the effective total coil length L of the embodiment is about twice the length of the latter. Therefore, the first embodiment of FIG. 9 can obtain the torque T of two times the torque of FIG. 3.

When the first embodiment is compared with four-pole motor type of FIG. 5 of the prior art, two gaps between permanent magnets are necessary in the embodiment, but three gaps are needed in the prior art, and further, the embodiment can increase the number of turns of the flat coil more than that of the prior art. A distribution of magnetic flux of FIG. 9 has a wider uniform zone in a lateral direction than that of FIG. 5, in which a comparatively sharp polarity change occurs over the two parallel portions 74a of coil windings. These factors results in increasing the torque of the rotary actuator of the present invention by the increased magnetic flux density B and the increased effective coil length L.

Three permanent magnets 6 to 8 are subjected to the magnetic attractive force toward the yoke core 1a, however, the attractive forces caused by two permanent magnets 6 and 8 are almost opposite in direction and the effects thereof are canceled. The resultant attractive force, which causes a load to the bearings (not shown) in supporting the rotor 4 around the axis 5, does not increase so much as the torque increase.

In the above explanation, the flat coils are arranged on the stator side and the permanent magnets are arranged on the rotor side in the first embodiment of the present invention. However, these arrangements can be reversed.

Figure 10:
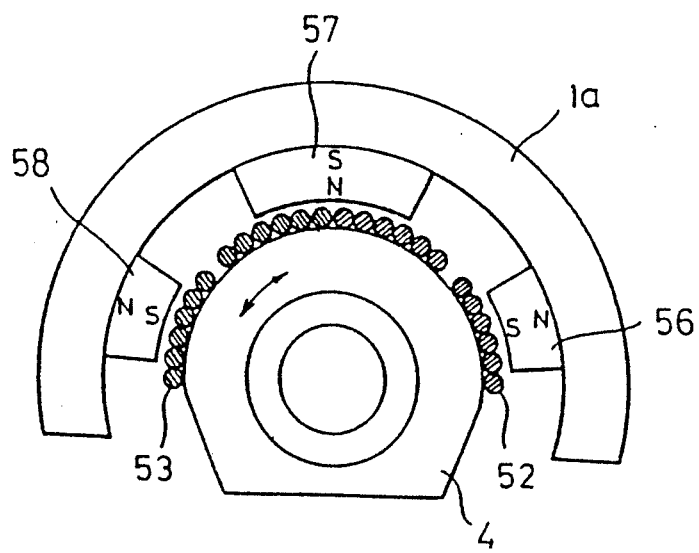
FIG. 10 is a cross section of a rotary actuator of a second embodiment of the present invention, in which the arrangements of flat coils and permanent magnets are reversed.

FIG. 10 is a schematic cross section of a second embodiment of the present invention with regard to the arrangement of coils and permanent magnets. A permanent magnet 57 having a larger width is fixed at the center on an arcuate inner surface of the yoke 1a, and two permanent magnets 56 and 58 having a smaller width are arranged on both sides of the permanent magnet 57, having an equal distance apart from the center magnet 57. The polarity arrangement is the same as the first embodiment. Two flat coils 52 and 53 are fixed on a rotor surface facing the permanent magnets 56 to 58, having no gap between two flat coils.

In the first embodiment explained using FIGS. 6 through 9, the flat coils 2 and 3 provide the turning portions 2b, 2d, 3b and 3d of coil windings, and these portions do not contribute to generate torque. In order to get more torque within a limited height of a rotary actuator, it is desirable to increase the number of turns of each flat coil and increase an effective vertical parallel portions of coil windings 2a, 2c, 3a and 3c. However, turning portions 2b, 2d, 3b and 3d occupy a considerable part of the vertical height of the flat coil.

Figure 11:
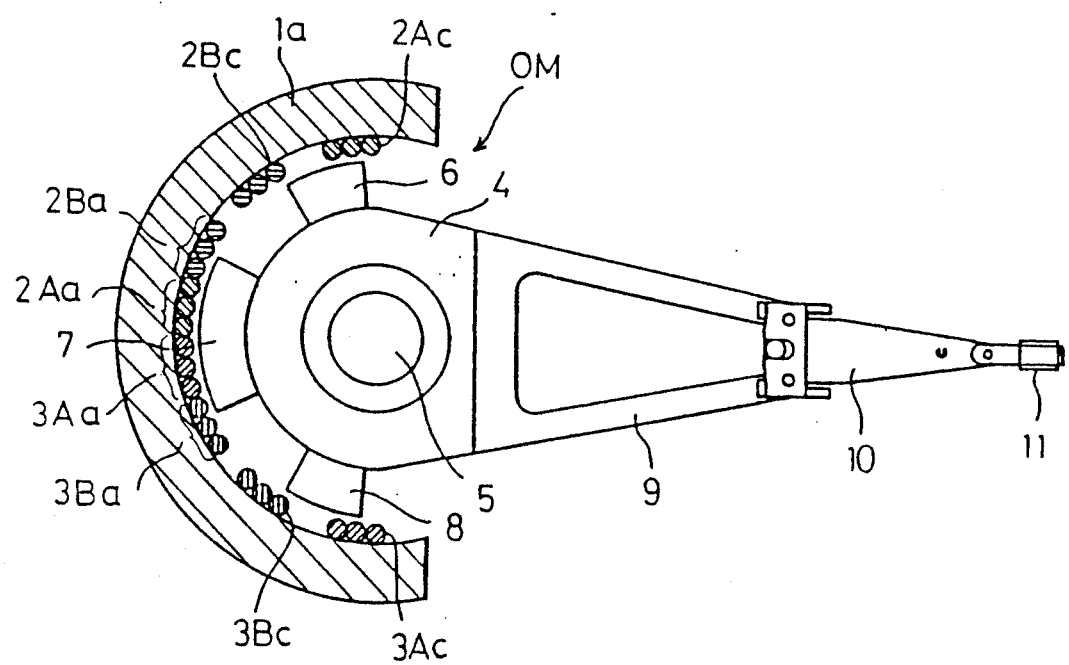
FIG. 11 is a schematic cross section of a rotary actuator of a third embodiment of the present invention using two flat coils and three permanent magnets, each of the flat coils having an outer and an inner coil.
Figure 12:
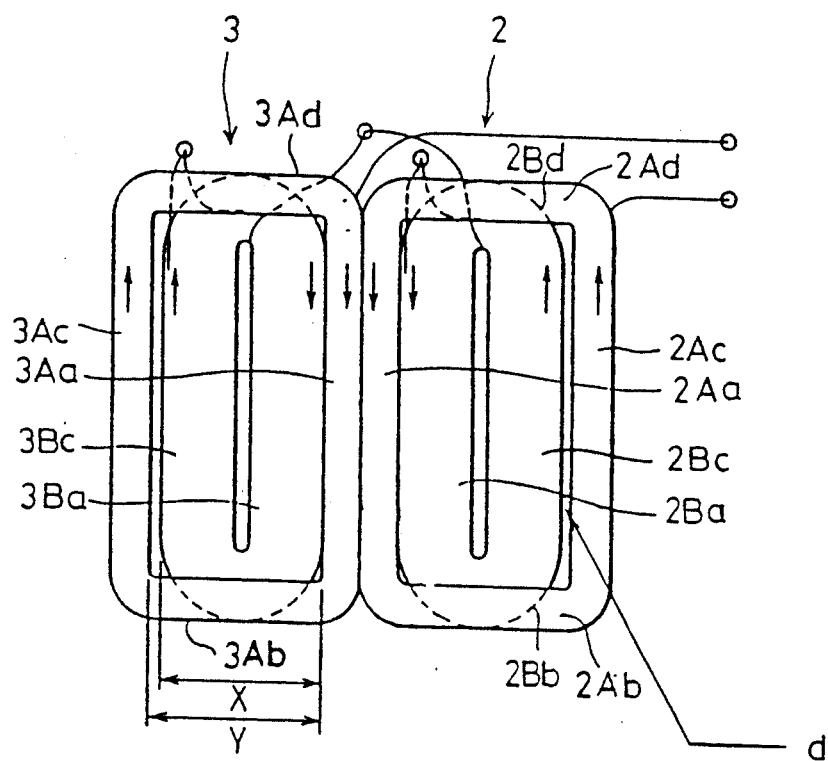
FIG. 12 is a plan view of the two flat coils of the third embodiment.
Figure 13:
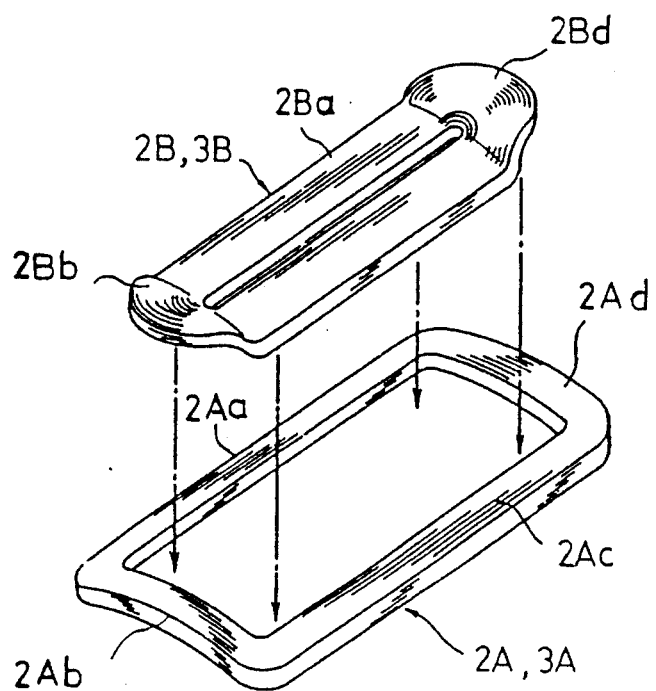
FIG. 13 is a perspective view of the outer and inner coils of the third embodiment.
Figure 14:
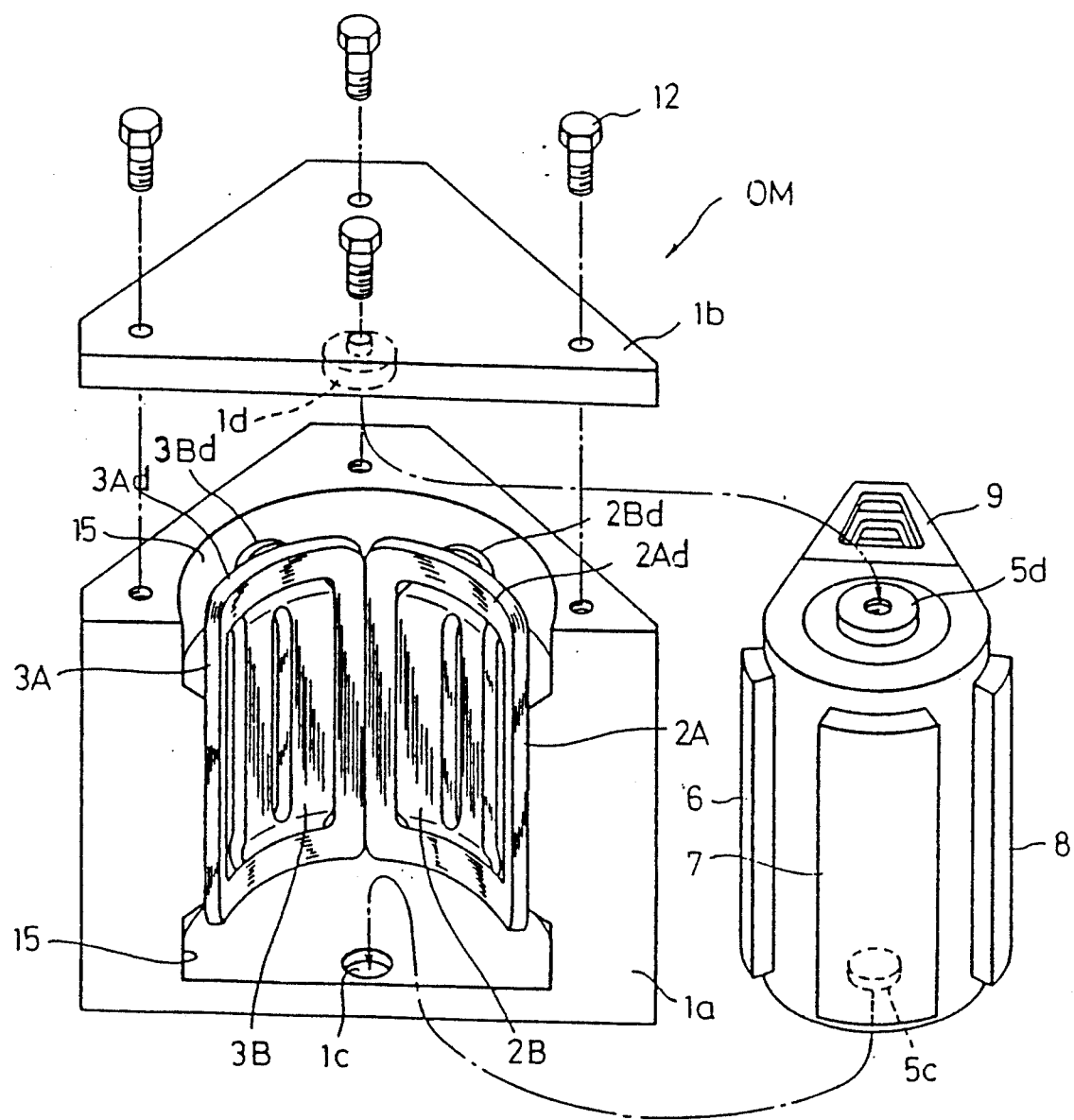
FIG. 14 shows a perspective view of the rotary actuator of the third embodiment, in which a yoke cover and a rotor and arm assembly are removed and separately shown.

A third embodiment of the present invention aims to improve the above problem and increase the effective parallel portions of the coil winding. FIGS. 11 through 14 are related to the third embodiment. FIG. 11 shows a cross section of the third embodiment of a rotary actuator OM, and FIGS. 12 and 13 show respectively a plan view of two flat coils and a perspective view of each flat coil. FIG. 14 shows a perspective view of the rotary actuator OM of the third embodiment.

As the rotary actuator, the principal structures of first and third embodiments are the same except those of flat coil 2 and 3. Same or like reference numerals used in FIGS. 11 through 14 designate same or like parts used in FIGS. 6 to 8. Therefore, the detailed explanations of the similar parts of the third embodiment are omitted. Two flat coils 2 and 3 of the third embodiment have the same design, however, each flat coil consists of an outer coil and inner coil. As shown in FIGS. 12 and 13, the flat coil 2 consists of outer coil 2A and inner coil 2B, and the flat coil 3 consists of outer coil 3A and inner coil 3B. Each of outer and inner coils has four portions such that the outer coil 2A has two parallel portions 2Aa and 2Ac and two turning portions 2Ab and 2Ad and that the inner coil 2B has parallel portions 2Ba and 2Bc and turning portions 2Bb and 2Bd.

The terminals of two pair coils 2 and 3 are connected to the driving source such that the directions of electric current flowing four coil portions 2Aa, 2Ba, 3Aa and 3Ba are the same as in the first embodiment.

The special features of the third embodiment exist in that each of flat coils 2 and 3 consists of the outer and inner coils. The inner coil, e.g., 2B is arranged and fitted into the outer coil 2A when assembled, and further as shown in FIG. 13, the turning portions 2Bb and 2Bd of the inner coil 2B are bent outwardly such that portions 2Bb and 2Bd respectively are disposed over and overlapped on the curved turning portions 2Ab and 2Ad.

In order to fit two flat coils 2 and 3 on a yoke core 1a of FIG. 14, the yoke core 1a provides a recess or a groove 15 at upper and lower portions of the inner surface thereof. The outwardly protruding portions (turning portions 2Bb, 2Bd, 3Bb and 3Bd) of inner coils 2B and 3B are received in the recess or groove 15. As shown in FIG. 12, two flat coils 2 and 3 are arranged such that two parallel portions 2Aa and 3Aa of coil windings are closely contacting with each other and further two inner coils 2B and 3B are arranged such that no gap is left between portions 2Aa and 2Ba, and 3Aa and 3Ba. As a result, a gap d remains between portions 2Ac and 2Bc, and between portions 3Ac and 3Bc. In FIG. 12, an inside width Y of the outer coil 3A is larger than an outside width X of inner coil 3B, therefore, the gap d remains on both sides.

Figure 15:
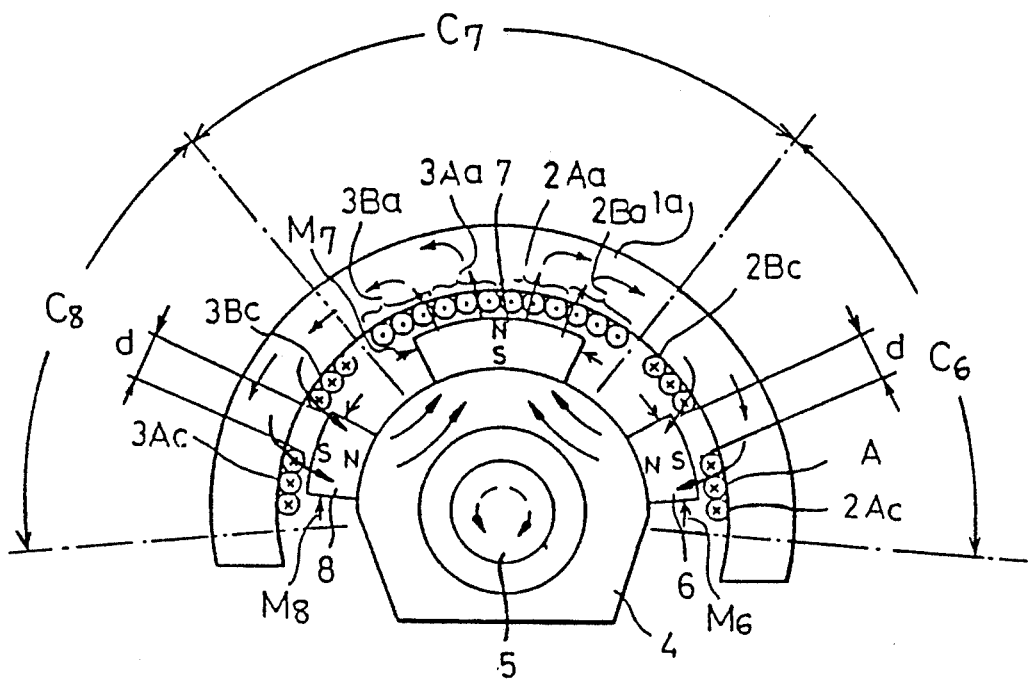
FIG. 15 is a cross section of the rotary actuator of the third embodiment for explaining the principle of the invention, in which lateral widths of coils and permanent magnets and directions of magnetic flux are shown.

The relative arrangements of the flat coils 2, 3 to a rotor 4 with three permanent magnets 6, 7, 8 fixed thereon, are schematically illustrated in FIG. 11. The magnetic flux penetrating through yoke core 1a, permanent magnets 6 to 8 and rotor 4 are shown in FIG. 15, which is similar as FIG. 9. There is one difference that gap d is provided between parallel coil portions 2Ac and 2Bc, and portions 3Ac and 3Bc.

Figure 16:
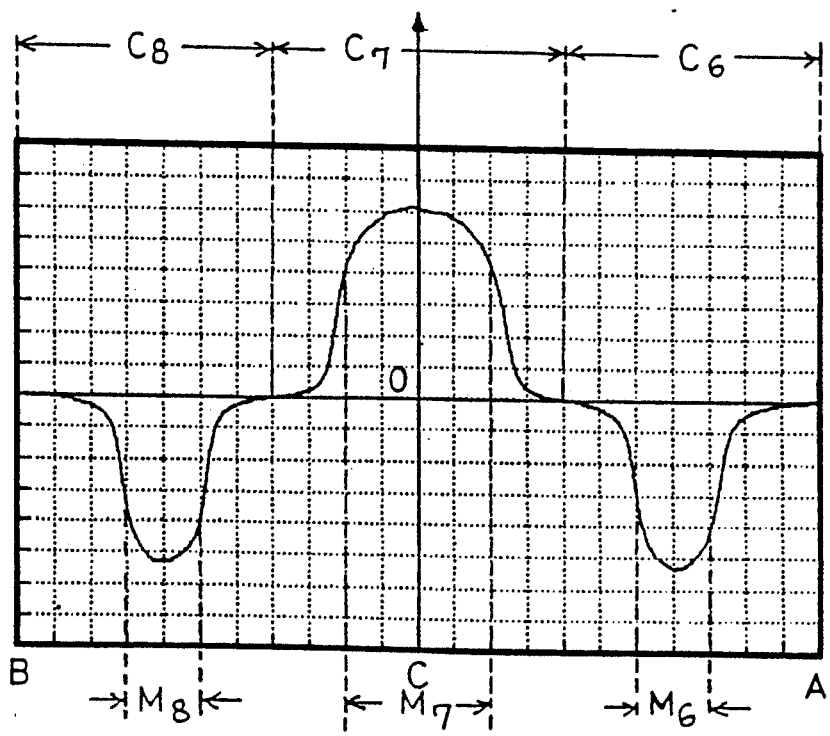
FIG. 16 is a graph illustrating a magnetic flux density measured in the gap region along the periphery of the inner surface of the yoke of the third embodiment.

As explained in the first embodiment, the motor torque is proportional to BL (called a force constant), in which B is a magnetic flux density and L is an effective total length of the flat coil winding. The provision of the gap d alleviates a change in BL value when the rotor 4 rotates. FIG. 16 shows a graph illustrating a distribution of the magnetic flux density along the periphery of the inner surface of the yoke core 1a. Position C on the abscissa shows the center of the yoke core 1a and positions A and B show circumferentially right and left ends of the effective coil zone respectively.

When the rotor 4 is positioned at the center of an oscillatory movement, the relative widths of magnets and coils are also shown in FIG. 16, where $M_6$, $M_7$ and $M_8$ designate lateral widths of permanent magnets $M_6$, $M_7$ and $M_8$ respectively, and $C_6$, $C_7$ and $C_8$ designate the effective lateral widths corresponding to (2Ac+d+2Bc), (2Aa+2Ba+3Aa+3Ba) and (3Ac+d+3Bc) respectively as illustrated in FIG. 15. If the gap d is not provided, two side magnets 6 and 8 have a smaller travel range, in which the torque to each magnet is almost uniform, than that for the center magnet 7. In the embodiment, therefore, the gap d is provided in $C_6$ and $C_8$. Thus, the difference between widths $C_7$ and $M_7$ is brought substantially equal to each difference between widths $C_6$ and $M_6$ and between widths $C_8$ and $M_8$.

When the rotor 4 rotates, the relative positions of coils, shown b $C_6$, $C_7$ and $C_8$ in FIG. 16, move to left and right sides. A torque change is remarkably reduced, because the gap d is provided between coil portions 2Ac and Bc, and between portions 3Ac and 3Bc. The third embodiment of the invention has effects of increasing the effective lateral widths $C_6$ and $C_8$ and reducing the sharp torque change.

Figure 17:
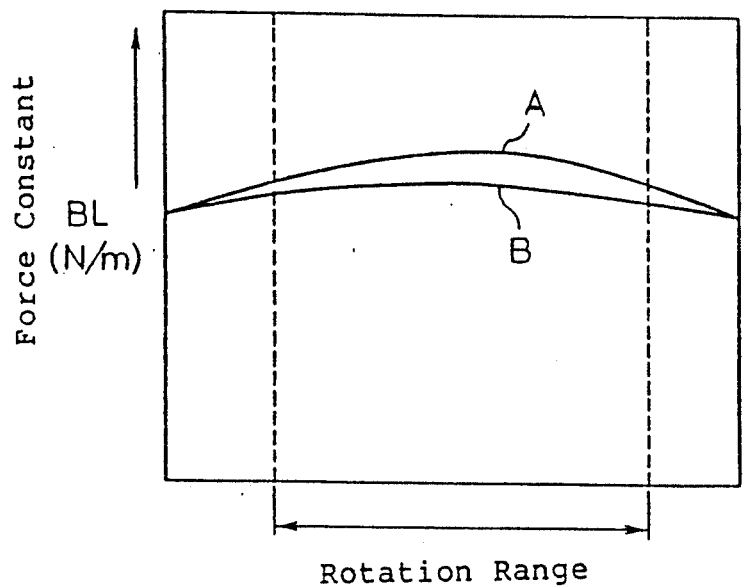
FIG. 17 is a graph illustrating a force constant curve in the rotation range, in which the gap d in the third embodiment is changed.

FIG. 17 is a graph illustrating a force constant BL curve for two cases by simulation. Curve A shows a case in which the inner coils 2B and 3B are wound large enough such that there is no gap left between parallel portions 2Ac and 2Bc, and 3Ac and 3Bc, and curve B shows a case in which the gaps d are provided as shown in FIG. 15. A peak value BL of curve A is higher than that of curve B by a few percents, however, curve B shows a flat characteristic compared with curve A.

Figure 18:
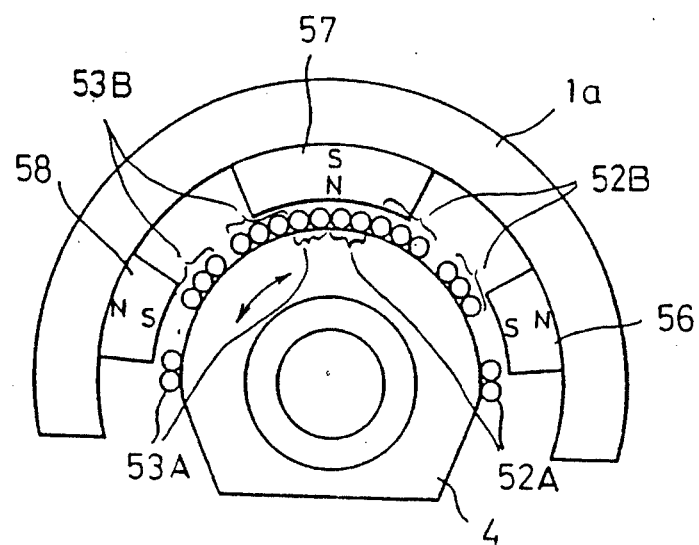
FIG. 18 is a cross section of a rotary actuator of a fourth embodiment of the present invention, in which the arrangements of coils and permanent magnets in the third embodiment are reversed.

FIG. 18 is a schematic cross section of a fourth embodiment of the present invention in arranging the permanent magnets and coils. A wide permanent magnet 57 is fixed on an inner surface of the yoke core 1a and two permanent magnets 56 and 58, having a smaller width, are arranged on both sides of the permanent magnet 57 having an equal distance apart from the center magnet 57. The polarity arrangement is similar as the third embodiment. Two flat coils 52 and 53 are fixed on a rotor surface, having no gap between two flat coils. Each of two coils 52 and 53 has a outer coil 52A (53A) and an inner coil 52B (53B) as the third embodiment. Relations of the coil widths to the magnet widths and relative positions thereof are similar as the third embodiment. The electrical connections to a power source are also similar as the third centrally located parallel portions of the inner and outer coils are in the same direction.

Figure 19:
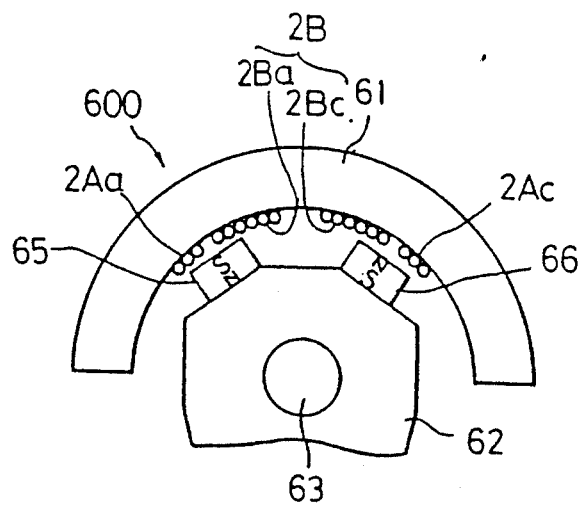
FIG. 19 is a schematic cross section of a rotary actuator of a fifth embodiment of the present invention, in which two permanent magnets and a pair of outer and inner coils are used.
Figure 20:
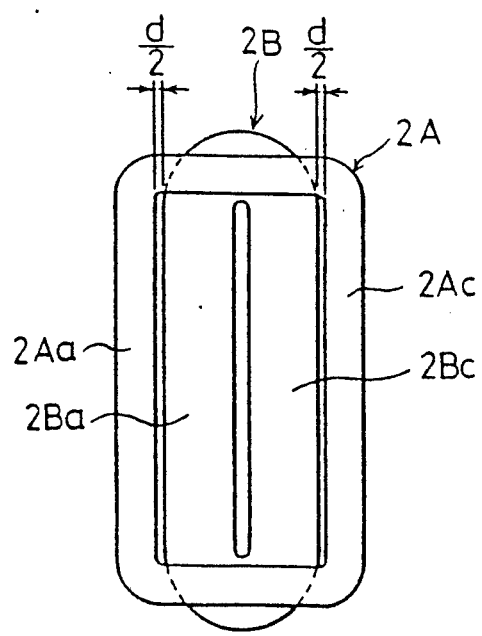
FIG. 20 is a plan view of the pair of coils of the fifth embodiment.

The flat coil structure having the outer and inner coils such as used in the third embodiment, can be applied to a two-pole motor. A fifth embodiment applied for the two-pole type is shown in FIG. 19, and its coil structure is shown in FIG. 20. The flat coil 2 consists of an outer coil 2A and an inner coil 2B. the inner coil 2B is arranged such that two equal gaps d/2 are provided between parallel portions 2Aa and 2Ba and between portions 2Ac and 2Bc. One permanent magnet 66 faces a gap between coil portions 2Ac and 2Bc, and the other permanent magnet 65 faces a gap between parallel portions 2Aa and 2Ba.

The embodiments disclosed so far are related with the structures for obtaining a larger and uniform torque of a rotary actuator over a wide range of rotation. Next, another embodiment which eliminates a mechanical resonant vibration of a rotor and arm assembly is disclosed.

Generally speaking, a rotor and arm assembly, comprising such as a rotor assembly, an arm assembly with a head assembly, is preferable to have a high rigidity or a high stiffness, and a high resonant frequency. Many types of rotor and arm assembly of the prior art have a main resonant frequency as low as 2 KHz.

In the embodiments of the present invention previously disclosed, the resonant frequency has been raised in a range from 6 to 7 KHz. However, a peak amplitude at the resonance frequency is still high, it is requested to reduce the peak amplitude as much as possible in order to improve stability in positioning a magnetic head with a high speed.

Figure 21:
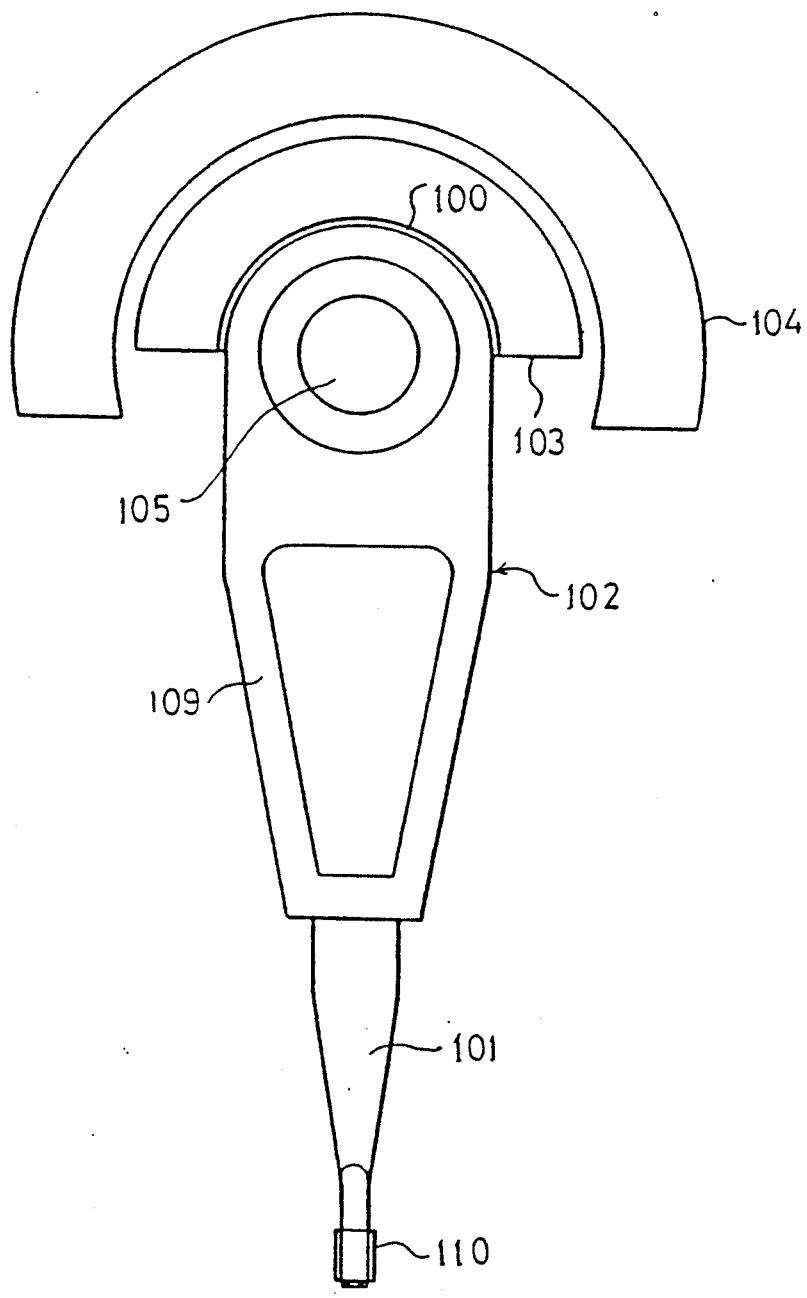
FIG. 21 is a schematic and simplified cross section of a rotary actuator of the present invention in which a dynamic damper is introduced in order to reduce mechanical resonant vibration of an arm assembly.
Figure 22:
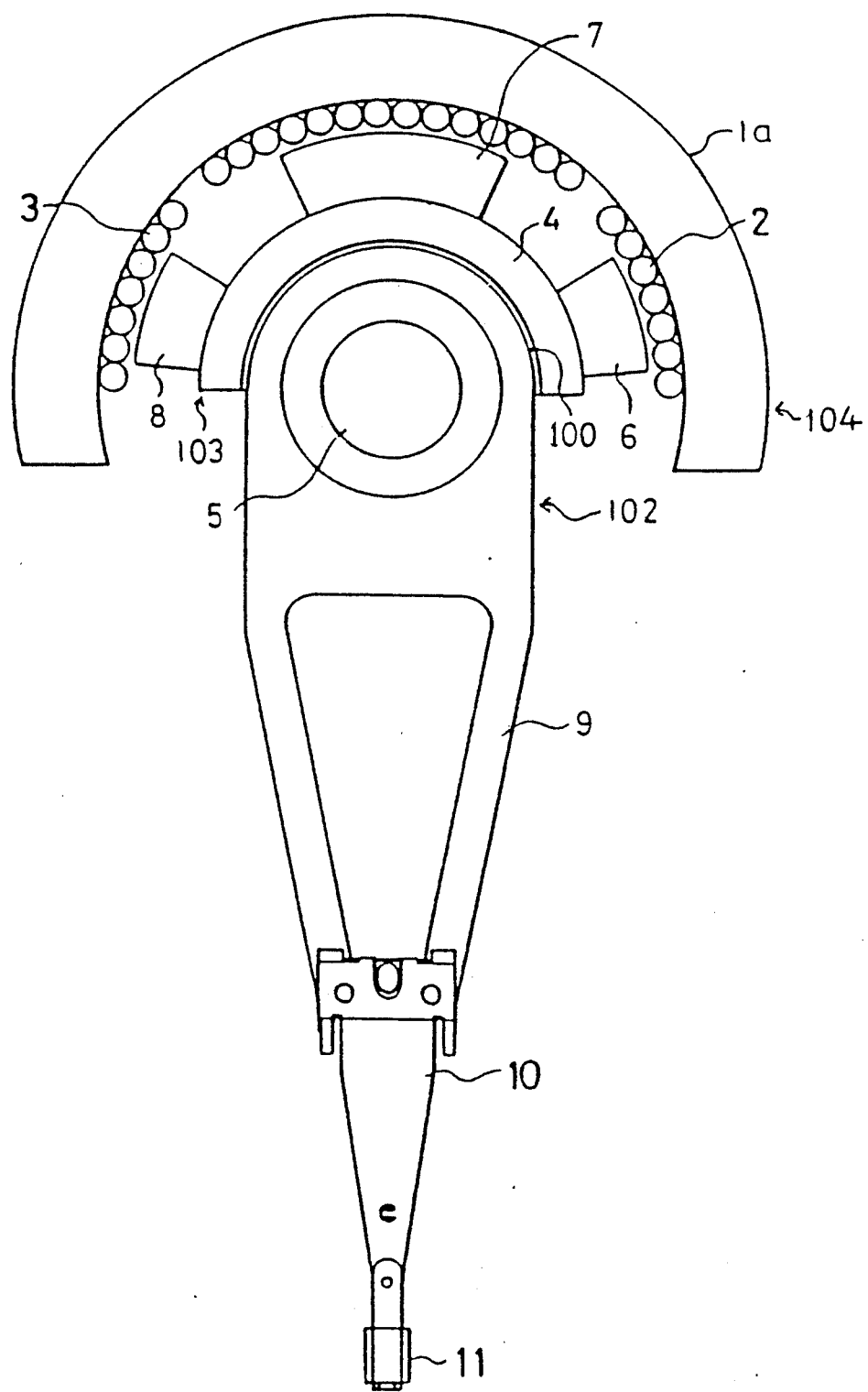
FIG. 22 is a cross section of an actual structure of a rotary actuator of the present invention, in which the dynamic damper structure is introduced between a rotor assembly and arm assembly.

The principle of the present invention for improving a resonant effect is explained using a schematic drawing of FIG. 21, and an actual embodiment thereof is shown in FIG. 22. In FIG. 21, a rotary actuator includes a stator assembly 104 comprising a yoke, coils, etc., which are not shown individually. As rotatable parts, an arm assembly 102 including a plurality of arms 109 and head assemblies 101, is arranged and rotatable around a fixed axis 105. The arms 109 are arranged in a projecting way from the axis 105, and a rotor assembly 103 comprising a rotor yoke and permanent magnets (not shown), is fixed to a semicylindrical wall surface of the arm assembly 102 using an elastic adhesive layer 100 therebetween.

When an oscillatory body having the arm assembly 102 and rotor assembly 103 is subjected to a rotational movement, a magnetic head 110 disposed on a tip position of the head assembly 101 is required to follow a precise path directed by a driving current from a servo system, avoiding a natural oscillation of the arm assembly 102 as much as possible.

The rotor and arm assembly of the embodiment of the present invention includes a first oscillatory system and a second oscillatory system, the first oscillatory system being formed by the arm assembly 102 including arms 109 and head assembly 101, and the second oscillatory system being formed by the rotor assembly 103 including rotor and permanent magnets which is connected to the first oscillatory system by the elastic adhesive layer 100. In the embodiment of the present invention, a damping function is given to the second oscillatory system which absorbs an energy of natural oscillation of the first oscillatory system, in other words, it functions as a damper or a dynamic absorber.

Figure 7:
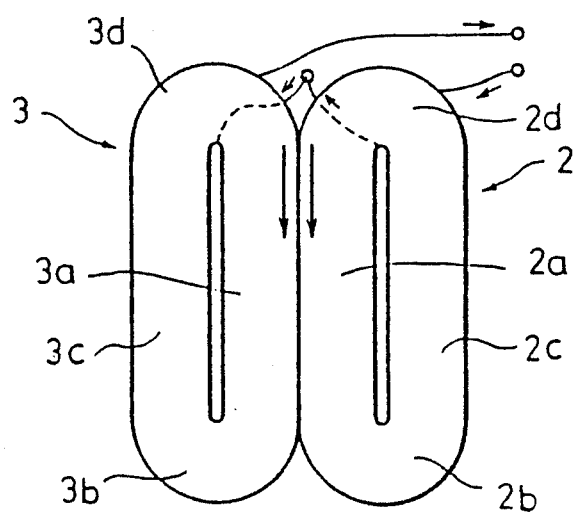
FIG. 7 is a plan view of the two flat coils of the first embodiment.

An actual structure of the embodiment is shown in FIG. 22, in which the damper structure is added to the rotary actuator disclosed in the first embodiment of FIGS. 6 through 8. The stator assembly 104 comprises a yoke core 1a and flat coils 2 and 3, and the rotor assembly 103 comprises permanent magnets 6, 7, and 8, and a rotor yoke 4 which has a semicylindrical shape. Arms 9 are main part of the arm assembly 102 and made of aluminum or magnesium alloy in order to reduce the weight thereof. The arm assembly 102 is supported by bearings and rotatable around an axis 5. A head assembly 10 is fixed to each arm 9 and a magnetic head 11 is disposed on a tip portion of the head assembly 10.

The structures of flat coils 2 and 3, and permanent magnets 6 to 8 are similar as those in the first embodiment, therefore, the details thereof are omitted. The important difference exists in that an elastic adhesive layer 100 is used to support the rotor yoke 4 having permanent magnets 6 to 8 and combine it with the arm assembly 102.

When an elastic coefficient of the elastic adhesive layer 100 is low and an adhesive strength thereof is also small, auxiliary means for supporting the rotor assembly such as a bolt is utilized to an extent that a damping effect is not be deteriorated.

As the material of the elastic adhesive layer 100, TB-3062B (trade name) of Tokyo Three Bond (3B) Company or EP01 (trade name) of Cemedine Co., LTD. may be used.

It is assumed that a solid body having a mass m, is supported by an elastic adhesive layer on another body, and it is subjected to an oscillating movement of the latter body. Herein, the elastic adhesive layer has a thickness t, a contacting surface area A, a shear spring constant k, a modulus of shearing elasticity of G, and a shear displacement λ when subjected to a shearing force p. Then, an oscillatory system formed by the solid body having the elastic adhesive layer, has a natural (resonant) frequency f, which is given by the following equation, $$f = (1/2\pi)\sqrt{k/m}, [Hz] \text{ where } k = p/\lambda = GA/t.$$

When the desirable frequency data is given, then the necessary shear spring constant k can be obtained. From the k value, the required surface area A and thickness t can be also obtained.

In the embodiment, m is given by a mass of the rotor yoke 4 and permanent magnets 6 to 8. When the conditions such as m=70 g, A=12 cm², t=0.005 cm, and G=50 g/cm²500 N/cm², are chosen, the shear spring constant k is given as $1.2 \times 10^6$ N/cm, resulting in giving the natural frequency data of 6.6 KHz.

The above resonant frequency data of 6.6 KHz for the second oscillatory system of the embodiment is very close to a resonant frequency value of the first oscillatory system formed by the arm assembly. The rotor assembly with the elastic adhesive layer has a function of absorbing the resonant movement of the arm assembly.

Generally speaking, it is preferable to provide a dynamic damper near a position of the maximum amplitude of the main oscillatory system, and the weight of the dynamic damper is preferably chosen in a range from 5 to 10 % of the weight of the main oscillatory system. In the present embodiment, it is practically impossible to provide the dynamic damper near the magnetic head 11 of the main oscillatory system. Further, the weight of the second oscillatory system is very close to that of the first (main) oscillatory system. In the embodiment, the dynamic damper has a comparatively heavy weight and further it is provided at an opposite end of the arm assembly, however, it still works to reduce the peak amplitude at resonance.

Figure 23:
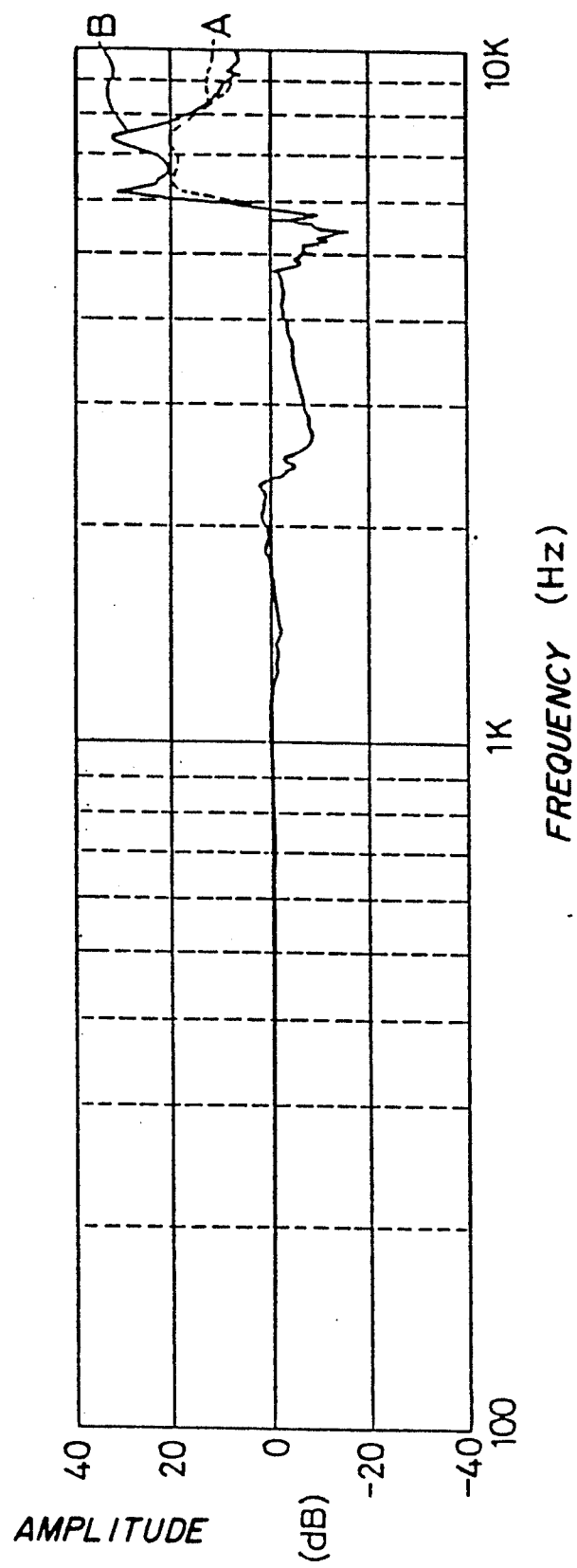
FIG. 23 is a graph illustrating effects of the dynamic damper, in which the curve A of the embodiment shows a remarkable improvement in reducing the relative amplitudes at resonant frequencies.

FIG. 23 shows a graph illustrating a relative amplitude characteristic versus frequency. A dashed curve A shows the data for the embodiment, and curve B shows the data for the first embodiment of the present invention without a damper. The ordinate level is shown in dB unit, taking the 0 dB level as the standard level without a resonance effect. The curve B shows a resonant effect at two frequency points between 6 and 7.5 KHz, peak amplitudes reaching around 30 dB. However, curve A of the embodiment shows a peak value of about 20 dB. The embodiment achieved a remarkable improvement in reducing the peak amplitude.

In the embodiment of FIG. 22, permanent magnets 6 to 8 are arranged on the rotor yoke surface and the coils 2 and 3 are arranged on the inner surface of the yoke core 1a, however, the arrangements may be reversed such that permanent magnets are arrange on the inner surface of the yoke core and coils may be arranged on the rotor side.

The final embodiment relates to a more detailed structure of a rotary actuator, in which a fixing method of the center axis thereof to a disk drive, a connecting method of an arm assembly with a head assembly and a stator structure are disclosed.

Figure 24B:
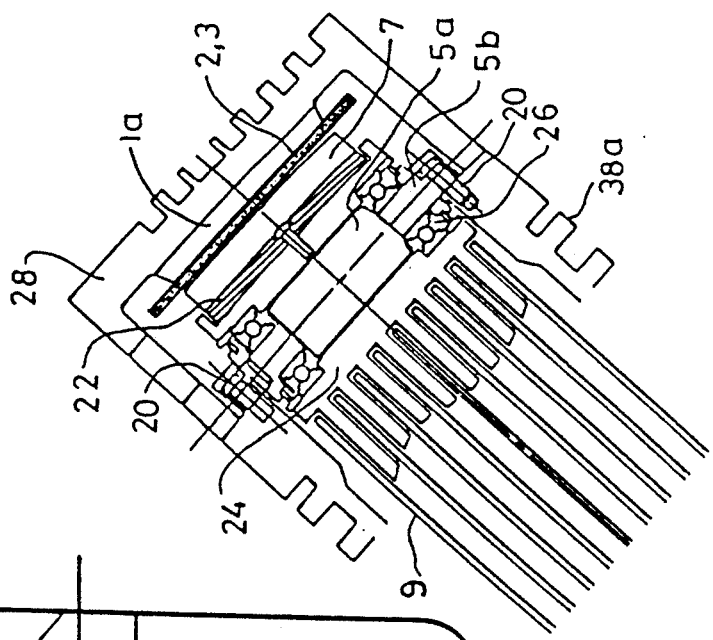
FIGS. 24(a) and 24(b) show a plan view of a disk drive and a cross sectional view of a rotary actuator respectively, in which the rotary actuator of the present invention as well as the disk assembly is directly fixed to the same disk enclosure.
Figure 24A:
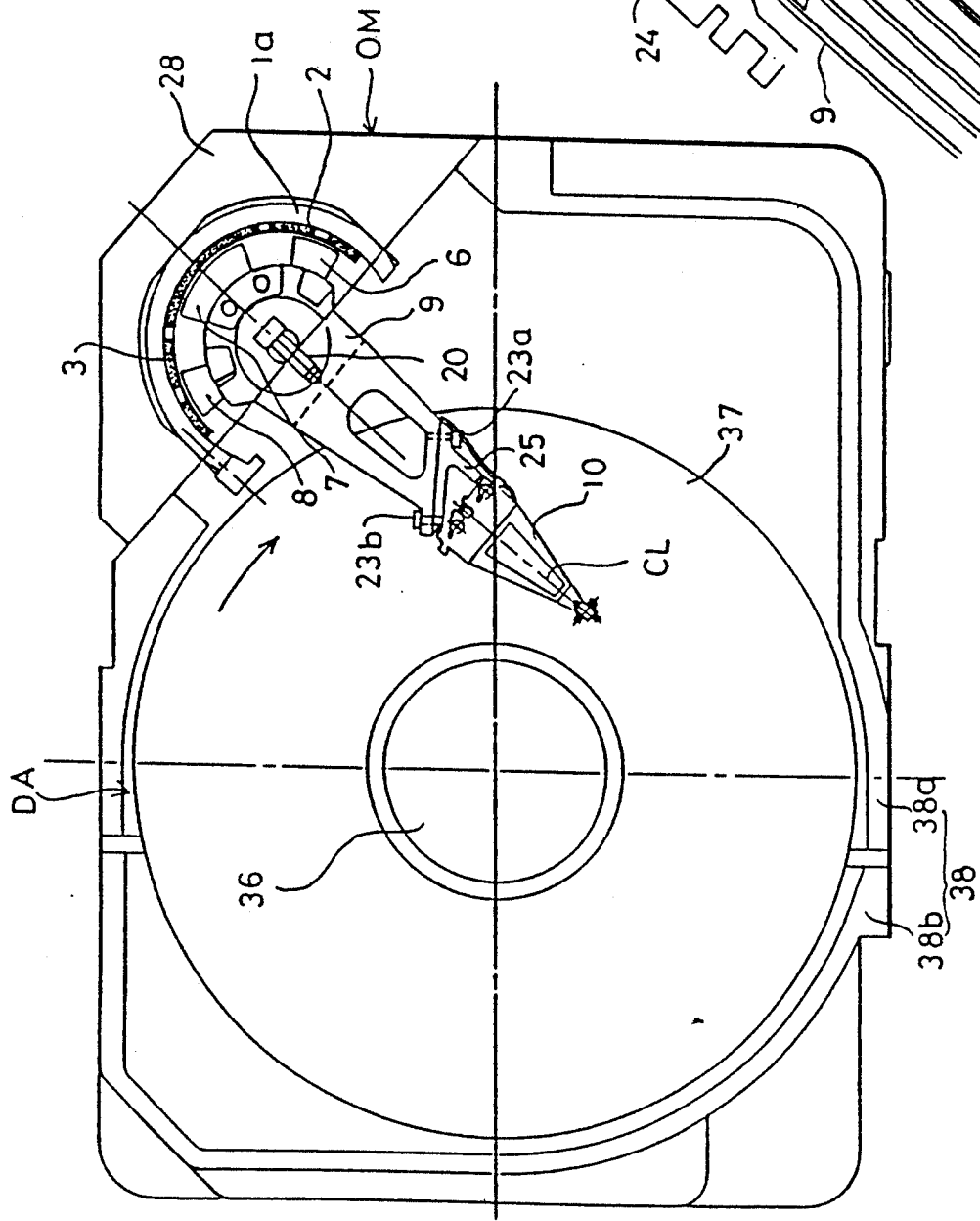

FIG. 24(a) shows a top view of the disk drive comprising a rotary actuator, cover portions of enclosure parts being removed, and FIG. 24(b) shows a cross section of the rotary actuator OM. A disk enclosure 38 has two separable parts 38a and 38b. A disk assembly DA including disks 37, a spindle 36, and a spindle motor (not shown) is fastened to upper and lower cover portions of the main disk enclosure 38a.

A rotary actuator OM is arranged at a corner of the disk enclosure 38a, and a stator housing 28, in which a yoke core 1a and coils 2 and 3 are fixed, and the stator housing 28 also serves as a part of the enclosure. Coil and magnet structures are similar as those of the first and third embodiments, therefore, details are omitted. Same or like reference numerals designate same or corresponding parts previously explained.

In FIG. 24(a), the disk drive has two rotary units, one being the disk assembly DA having disks 37 and spindle 36 and the other, the rotary actuator OM. The spindle 36 with disks is made to rotate by a spindle motor (not shown). In order to get a precise positioning of a magnetic head onto the disk surface and to obtain further a high reliability throughout a life of the disk drive, it is very important that both directions of the central axis 5 (5a and 5b) of the rotary actuator OM and center axis of the spindle 36, are maintained in a precise parallel alignment with each other. The conventional way of fixing the axis 5 to the stator cover portions and, thereafter, assembling the rotary actuator with the main disk enclosure 38, is insufficient to obtain a high precision in parallelism.

In FIGS. 24(a) and 24(b), both axes are firmly fixed to a single enclosure body. The central axis of the rotary actuator OM has a middle portion 5a having a larger diameter and two end portions 5b having a smaller diameter. At the end portions, a hole is formed vertically to the direction of the axes 5a and 5b. Two end portions 5b of the axis are firmly fixed to side walls of the upper and lower covers of the main disk enclosure 38a using a bolt 20 and a tapped hole formed in the side walls, the side walls being formed for an opening to install the rotary actuator OM. Therefore, the main disk enclosure 38a supports both rotary actuator OM and disk assembly DA.

The stator housing 28 is made of aluminum alloy to reduce the weight of the disk drive and the yoke core 1a of soft iron is fixed firmly to the inner surface of the stator housing 28, and further flat coils 2 and 3 are fixed firmly on an inner surface of the yoke core 1a. In FIG. 24(b), the space portions between the inner surface of stator housing 28 and upper and lower portions of the flat coil 2 or 3 are utilized as a recess for receiving the turning portion for the inner coil as previously explained. The above stator structure having the stator housing 28 and yoke core 1a is very efficient to remove heat generated in the flat coils, resulting in reducing overall dimensions of the rotary actuator.

In FIG. 24(b), the rotor comprises a rotor body 24 of aluminum alloy, a rotor yoke 22 of soft magnetic material having a semicylindrical shape and permanent magnets 6 to 8. In the embodiment, the rotor body 24 is machined as an integral part with arms 9 and rotatably supported by the fixed axis 5 using a bearing 26. The integrally machined part of rotor body 24 and arm 9 reduces a moment of inertia of the arm and rotor assembly, and increases reliability. An end portion of the arm 9 is machined such that a wall is formed such that the wall surface has a first direction parallel to the longitudinal direction of the center axis of the rotary actuator and a second direction which is vertical to the first direction and oblique to that of the disk rotation. A head assembly 10 is first assembled with a connector 25 having a wall surface, which mates with another wall surface of the arm 9. The connector 25 with the head assembly 10 is thereafter fixed to the arm 9 using two bolts 23a and 23b. The direction of the center line CL of head assembly 10 is maintained almost in the same direction of the arm 9. Two tapped hole are formed, each on the wall surface of the arm 9 and connector 25 respectively, and the arm and connector are bolted together by two bolts 23a and 23b. Directions of bolts are opposite, therefore, it is easy to assemble the head assembly 10 with the arm 9.

The above head and arm assemblies are easy in assembling and have effects of enhancing a mechanical stiffness of the combined structure resulting in raising a resonant frequency and reducing a moment of inertia thereof.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalence of the claims are, therefore, to be embraced therein.

What is claimed is:

1. A rotary actuator comprising:
    a stator including a yoke having an arcuate inner surface extending in a longitudinal direction,
    a rotor supported rotatably within a limited angle range around a fixed axis, the axis being arranged in a region defined by said arcuate inner surface and parallel to said longitudinal direction,
    three permanent magnets arranged on an outer surface of said rotor, the center magnet having a lateral width larger than that of other two magnets and having substantially an equal distance from each of other two magnets and a polarity of the central magnet being opposite to that of other two magnets,
    an arm, one end thereof being fixed to said rotor and the other end projecting in an opposite direction away from said yoke, and
    two flat coils, each coil being arranged on the inner surface of said yoke and formed of two substantially parallel portions and two turning portions, and adjacently arranged two parallel portions of said two flat coils closely contacting with each other facing the center magnet and having electrical connection to a power source that electric currents flowing through said two adjacently arranged parallel portions are in the same direction.

2. A rotary actuator for positioning a read/write magnetic head on the target track on a disk assembly, the disk assembly having spindle means for rotating the disks around a spindle axis, the spindle means being supported by upper and lower portions of an disk enclosure, the rotary actuator being positioned at one corner of the disk enclosure, having arm means for moving the magnetic head back and forth in a radial direction of the disk with the rotation of the rotary actuator, said rotary actuator comprising:
    a stator including a yoke having an arcuate inner surface extending in a longitudinal direction,
    a rotor supported rotatably within a limited angle range around a fixed axis, the fixed axis being arranged in a region defined by said arcuate inner surface and parallel to said longitudinal direction,
    three permanent magnets arranged on an outer surface of said rotor, the center magnet having a lateral width larger than that of other two magnets and having substantially an equal distance from each of the other two magnets and a polarity of the central magnet being opposite to that of other two magnets,
    an arm, one end thereof being fixed to said rotor and the other end projecting in an opposite direction away from said yoke, and
    two flat coils, each coil being arranged on the inner surface of said yoke and formed of two substantially parallel portions and two turning portions, and adjacently arranged two parallel portions of said two flat coils closely contacting with each other facing the center magnet and having electrical connection to a power source that electric currents flowing through said two adjacently arranged parallel portions are in the same direction.

3. A rotary actuator as recited in claims 1 or 2, wherein a total lateral width of said two adjacently arranged parallel portions is larger than a lateral width of said center magnet, and each lateral width of the remaining parallel portions of said two flat coils is larger than each lateral width of the remaining two magnets.

4. A rotary actuator as recited in claim 3, wherein said lateral width of the center magnet is substantially twice that of other two magnets.

5. A rotary actuator as recited in claims 1 or 2, wherein a longitudinal length of parallel portions of said two flat coil is larger than that of three permanent magnets.

6. A rotary actuator as recited in claims 1 or 2, wherein each of said two flat coils comprises an inner coil and an outer coil, each of the inner and outer coils having two parallel portions and two turning portions, the inner coil being arranged inside the outer coil, and having electrical connection to the power source that currents flowing through said inner and outer coils are in the same direction.

7. A rotary actuator as recited in claim 6, wherein said arrangement of the inner coil includes that one parallel portion of each said inner coil on the center side closely contacts with the respective parallel portion of the outer coil on the center side, and a gap remains between the other parallel portion of each said inner coil and the other respective parallel portion of the outer coil.

8. A rotary actuator as recited in claim 6, wherein two turning portions of said each inner coil are bent outwardly and disposed on the the turning portions of the outer coil.

9. A rotary actuator as recited in claim 8, wherein a recess is formed on the inner surface of said yoke, the recess being located at a corresponding position of said outwardly bent turning portion of said inner coil, and having a sufficient size for receiving it when said flat coil is arranged on the inner surface of said yoke.

10. A rotary actuator as recited in claim 2, wherein said fixed axis of the rotor provides means for fixing both end portions of the rotor to the side walls of the upper and lower portions of the disks enclosure, the side walls being formed for an opening to install the rotary actuator to the disk enclosure.

11. A rotary actuator as recited in claim 10, wherein said fixing means comprises a hole formed at both end portions of the axis, the direction of the hole being vertical to the direction of said axis, whereby the rotary actuator is fixed to the disk enclosure using the hole and a bolt.

12. A rotary actuator as recited in claim 2, wherein said stator further comprises a stator having, the stator housing being fixed to the disk enclosure at said one corner and forming a part of a completed disk enclosure, said yoke being fixed to an inner wall surface of the stator housing, and said two flat coils are fastened to the inner surface of the yoke, whereby heat generated in the flat coils is removed from an outer surface of the stator housing by thermal conduction through the yoke and stator housing.

13. A rotary actuator according to claims 1 or 2, wherein said one end of the arm is fixed to said rotor, an elastic adhesive layer being intervened therebetween to thereby have the elastic adhesive layer function as a dynamic damper when the actuator is excited.

14. A rotary actuator according to claim 13, wherein said rotor has an arcuate inner surface and said one end of the arm has a projecting arcuate outer surface engaged with said inner surface of the rotor.

15. A rotary actuator as recited in claim 13, wherein said rotor held by the elastic adhesive layer has a natural vibration frequency close to that of said arm.

16. A rotary actuator comprising:
a stator including a yoke having an arcuate inner surface extending in a longitudinal direction,
three permanent magnets arranged on the inner surface of said yoke, the center magnet having a lateral width larger than that of other two magnets and having substantially an equal distance from each of other two magnets and a polarity of the central magnet being opposite to that of other two magnets,
a rotor supported rotatably within a limited angle range around a fixed axis, the axis being arranged in a region defined by said arcuate inner surface and parallel to said longitudinal direction,
an arm, one end thereof being fixed to said rotor and the other end projecting in an opposite direction away from said yoke, and
two flat coils, each coil being arranged on an outer surface of said rotor and formed of two substantially parallel portions and two turning portions, and adjacently arranged two parallel portions of said two flat coils closely contacting with each other facing the center magnet and having electrical connection to a power source that electric currents flowing through said two adjacently arranged parallel portions are in the same direction.

17. A rotary actuator as recited in claim 16, wherein each of said two flat coils comprises an inner coil and an outer coil, each of the inner and outer coils having two parallel portions and two turning portions, the inner coil being arranged inside the outer coil, and having electrical connection to the power source that current flowing through said inner and outer coils are in the same direction.

18. A rotary actuator as recited in anyone of claims 1, 2 or 16, wherein said other end of the arm has a first wall surface, the first wall surface having a first direction parallel to said longitudinal direction and a second direction vertical to the first direction and oblique to that of the disk rotation, and a connector is provided, the connector being assembled with a head assembly at one end and having a second wall surface at the other end, the second wall surface mating with the first wall surface of the arm and being assembled therewith, and the center line of a combination of the head assembly and connector is substantially in the same direction as that of the arm.

19. A rotary actuator comprising:
a stator including a yoke having an arcuate inner surface extending in a longitudinal direction,
a rotor supported rotatably within a limited angle range around a fixed axis, the axis being arranged in a region defined by said arcuate inner surface and parallel to said longitudinal direction,
two permanent magnets arranged on an outer surface of said rotor, a polarity of two magnets being opposite with each other,
an arm, one end thereof being fixed to said rotor and the other end projecting in an opposite direction away from said yoke, and
a pair of flat coils arranged on the inner surface of said yoke and comprising an inner coil and an outer coil, each coil having two parallel portions and two turning potions, the inner coil being arranged inside the outer coil, two turning portions of the inner coil being bent outwardly and disposed on the turning portions of the outer coil, both coils having electrical connection to a power source that currents flowing through said inner and outer coils are in the same direction.

* * * * *